US007638732B1

(12) United States Patent
Dobbs

(10) Patent No.: US 7,638,732 B1
(45) Date of Patent: Dec. 29, 2009

(54) APPARATUS AND METHOD FOR MAKING X-RAY ANTI-SCATTER GRID

(75) Inventor: John M. Dobbs, Hamilton, MA (US)

(73) Assignee: Analogic Corporation, Peabody, MA (US)

( * ) Notice: Subject to any disclaimer, the term of this patent is extended or adjusted under 35 U.S.C. 154(b) by 52 days.

(21) Appl. No.: 10/747,551

(22) Filed: Dec. 29, 2003

Related U.S. Application Data

(63) Continuation-in-part of application No. 10/280,301, filed on Oct. 24, 2002, now Pat. No. 6,807,252.

(51) Int. Cl.
*B23K 26/00* (2006.01)

(52) U.S. Cl. .............................. 219/121.7; 219/121.68; 219/121.67

(58) Field of Classification Search ................. 219/127, 219/121.67, 121.68, 121.7, 121.6; 378/154, 378/155
See application file for complete search history.

(56) References Cited

U.S. PATENT DOCUMENTS

| | | | | |
|---|---|---|---|---|
| 4,190,759 | A * | 2/1980 | Hongo et al. | 219/121.68 |
| 4,465,540 | A | 8/1984 | Albert | |
| 4,572,493 | A * | 2/1986 | Hubert | 5/608 |
| 4,951,305 | A | 8/1990 | Moore et al. | |
| 5,241,578 | A * | 8/1993 | MacMahon | 378/154 |
| 5,279,488 | A * | 1/1994 | Fleming | 248/279.1 |
| 5,388,143 | A * | 2/1995 | MacMahon | 378/206 |
| 5,418,833 | A | 5/1995 | Logan | |
| 5,455,849 | A | 10/1995 | Logan et al. | |
| 5,606,589 | A | 2/1997 | Pellegrino et al. | |
| 5,729,585 | A | 3/1998 | Pellegrino et al. | |
| 5,814,235 | A | 9/1998 | Pellegrino et al. | |
| 5,875,685 | A * | 3/1999 | Storaasli | 74/490.1 |
| 5,949,850 | A * | 9/1999 | Tang | 378/154 |
| 6,075,840 | A | 6/2000 | Pellegrino et al. | |
| 6,211,485 | B1 * | 4/2001 | Burgess | 219/121.7 |

(Continued)

OTHER PUBLICATIONS

Tang, Chae-Mei, et al, Precision Fabrication of two-dimensional anti-scatter grids; *Medical Imaging 2000: Physics of Medical Imaging*, pp. 647-657.

(Continued)

*Primary Examiner*—M. Alexandra Elve
(74) *Attorney, Agent, or Firm*—McDermott Will & Emery LLP

(57) ABSTRACT

An apparatus including a base, a linkage extending along a second axis and pivotally connected to the base for pivotal movement about a first axis perpendicular to the second axis, a leg having a first end pivotally connected to the linkage for pivotal movement about the second axis, and a frame secured to a second end of the leg. A stand extends from the base, and a first slide is secured to a distal end of the stand for pivotal movement with respect to the distal end of the stand. A first guide is supported by the first slide for movement with respect to the first slide, and a second slide is secured to an end of the first guide. A second guide is pivotally connected to the frame and supported by the second slide for movement with respect to the second slide. The frame can be used to support a plating mask and is movable along a surface of an imaginary sphere having a center located at the intersection of the first and the second axes.

15 Claims, 11 Drawing Sheets

U.S. PATENT DOCUMENTS

| | | | | |
|---|---|---|---|---|
| 6,455,805 | B1 * | 9/2002 | Boon et al. | 219/121.67 |
| 6,459,771 | B1 | 10/2002 | Mancini | |
| 6,621,044 | B2 * | 9/2003 | Jain et al. | 219/121.7 |
| 6,702,459 | B2 * | 3/2004 | Barnes et al. | 378/197 |
| 6,744,852 | B2 * | 6/2004 | Klotz et al. | 378/154 |
| 6,757,985 | B2 * | 7/2004 | Hall | 33/503 |
| 6,808,344 | B2 * | 10/2004 | Chen | 409/201 |
| 6,839,408 | B2 * | 1/2005 | Tang | 378/154 |
| 6,861,614 | B1 * | 3/2005 | Tanabe et al. | 219/121.66 |
| 7,203,274 | B2 * | 4/2007 | Charles et al. | 378/54 |

OTHER PUBLICATIONS

Tang, Chae-Mei, et al, Experimental and simulation results of two-dimensional prototype anti-scatter grids for mammorgraphy; *World Congress of Medical Physics and Biomedical Engineering*, Jul. 23-28, 2000.

* cited by examiner

APPARATUS AND METHOD FOR MAKING X-RAY ANTI-SCATTER GRID

CROSS-REFERENCE TO RELATED APPLICATION

The present application is a continuation-in-part of U.S. patent application Ser. No. 10/280,301, filed on Oct. 24, 2002 now U.S. Pat. No. 6,807,252, which is assigned to the assignee of the present application and incorporated herein by reference.

FIELD OF THE INVENTION

The present invention generally relates to the field of medical radiography, and more particularly to a method for making an X-ray anti-scatter grid for use in patient diagnostic imaging procedures. Even more particularly, the present invention relates to apparatuses for making an X-ray anti-scatter grid.

BACKGROUND OF THE INVENTION

Scattered X-ray radiation (sometimes referred to as secondary or off-axis radiation) is generally a serious problem in the field of radiography. Scattered X-ray radiation is a particularly serious problem in the field of X-ray patient diagnostic imaging procedures, such as mammographic procedures, where high contrast images are required to detect subtle changes in patient tissue.

Prior to the present invention, scattered X-ray radiation in patient diagnostic imaging procedures has been reduced through the use of a conventional linear or two-dimensional focused scatter-reducing grid. The grid is interposed between the patient and an X-ray detector and tends to allow only the primary, information-containing radiation to pass to the detector while absorbing secondary or scattered radiation which contains no useful information about the patient tissue being irradiated to produce an X-ray image.

Some conventional focused grids used in patient diagnostic imaging procedures generally comprise a plurality of X-ray opaque lead foil slats spaced apart and held in place by aluminum or fiber interspace filler. In focused grids, each of the lead foil slats, sometimes referred to as lamellae, are inclined relative to the plane of the film so as to be aimed edgewise towards the focal point of the X-rays emanating from an X-ray source. Usually, during an imaging procedure, the standard practice is to move the focused grid in a lateral direction, perpendicular to the lamellae, so as to prevent the formation of a shadow pattern of grid lines on the X-ray image, which would appear if the grid were allowed to remain stationary. Such moving grids are known as Potter-Bucky grids.

One problem with conventional grids of the type described above is that the aluminum or fiber interspace filler material absorbs some of the primary information-containing X-ray radiation. Because some of the primary radiation is absorbed by the interspace material, the patient must be exposed to a higher dose of radiation than would be necessary if no grid were in place in order to compensate for the absorption losses imposed by the grid. It is an obvious goal in all radiography applications to expose the patient to the smallest amount of radiation needed to obtain an image having the highest image quality in terms of film blackening and contrast.

Another problem with such conventional focused grids of the parallel lamellae type described above is that they do not block scattered radiation components moving in a direction substantially parallel to the plane of the lamellae. The resulting images using these grids have less than optimal darkness and contrast.

U.S. Pat. No. 5,606,589 to Pellegrino, et al. discloses air cross grids for absorbing scattered secondary radiation and improving X-ray imaging in general radiography and in mammography. The grids are provided with a large plurality of open air passages extending through each grid panel. These passages are defined by two large pluralities of substantially parallel partition walls, respectively extending transverse to each other. Each grid panel is made by laminating a plurality of thin metal foil sheets photo-etched to create through openings defined by partition segments. The etched sheets are aligned and bonded to form the laminated grid panel, which is moved edgewise during the X-ray exposure to pass primary radiation through the air passages while absorbing scattered secondary radiation arriving along slanted paths.

The method for Pellegrino, et al. produces sturdy cellular air cross grids having focused air passages offering maximum radiation transmissivity area and minimum structural area necessarily blocking primary radiation, while maintaining adequate structural integrity for the cross grid during use. The air cross grids maximize contrast and accuracy of the resulting mammograms produced with the same or comparable radiation dosages. However, present techniques for producing grids are unable to produce grids having a very fine pitch that is necessary for use with digital plates.

What is still desired, however, are improved apparatuses and methods for making focused anti-scatter grids with finer pitch. Preferably, such improved apparatuses and methods will be relatively easier, less time-consuming and less expensive than existing techniques for making focused anti-scatter grids.

SUMMARY OF THE INVENTION

Exemplary embodiments of the present invention provide techniques for making focused anti-scatter grids efficiently and with high precision in those attributes which are important. One exemplary embodiment of a method according to the present invention for manufacturing an anti-scatter grid having a desired height includes positioning a bottom surface of a mask of dielectric material, with a depth at least equal to the desired height of the anti-scatter grid, on a sheet of metal. First and second series of intrinsically focused slots are then cut through a top surface of the mask to the sheet of metal, and the sheet of metal is plated at the bottom of each of the slots of the mask with a radiopaque material to form partition walls of the anti-scatter grid. Plating the radiopaque material into the slots of the mask is continued until the desired height of the anti-scatter grid is achieved.

Exemplary embodiments of the present invention also provide an apparatus and a method for forming the plating mask. One exemplary embodiment of the apparatus move the plating mask over an imaginary surface of a sphere while holding the means for cutting slots stationary. This exemplary embodiment produces slots which are focused on the center of the sphere.

This exemplary embodiment of the apparatus includes a base, a linkage extending along a second axis and pivotally connected to the base for pivotal movement about a first axis perpendicular to the second axis, a leg having a first end pivotally connected to the linkage for pivotal movement about the second axis, and a frame secured to a second end of the leg. A stand extends from the base, and a first slide is secured to a distal end of the stand for pivotal movement with respect to the distal end of the stand. A first guide is supported by the first slide for movement with respect to the first slide, and a second slide is secured to an end of the first guide. A second guide is pivotally connected to the frame and supported by the second slide for movement with respect to the second slide. The frame can be used to support a plating mask and is movable along a surface of an imaginary sphere having a center located at the intersection of the first and the second axes. The intersection of the first and the second axes, therefore, act as a focal point for the plating mask.

Part of this exemplary embodiment of the apparatus provided in accordance with the present invention includes a photomask having a series of parallel slots for forming a single laser beam from a laser source into a series of parallel laser beams, and a lens for focusing the series of laser beams to a focal point. Intrinsically focused slots will be cut in a plating mask passed between the lens and the focal point perpendicular to a principle axis of the lens.

Additional aspects and advantages of the present invention will become readily apparent to those skilled in this art from the following detailed description, wherein exemplary embodiments of the present invention are shown and described, simply by way of illustration of the best modes contemplated for carrying out the present invention. As will be realized, the present invention is capable of other and different embodiments and its several details are capable of modifications in various obvious respects, all without departing from the invention. Accordingly, the drawings and description are to be regarded as illustrative in nature, and not as restrictive.

BRIEF DESCRIPTION OF THE DRAWINGS

For a fuller understanding of the nature and objects of the invention, reference should be made to the following detailed description taken in connection with the accompanying drawings, in which.

DETAILED DESCRIPTION OF EXEMPLARY EMBODIMENT

Figure 1:
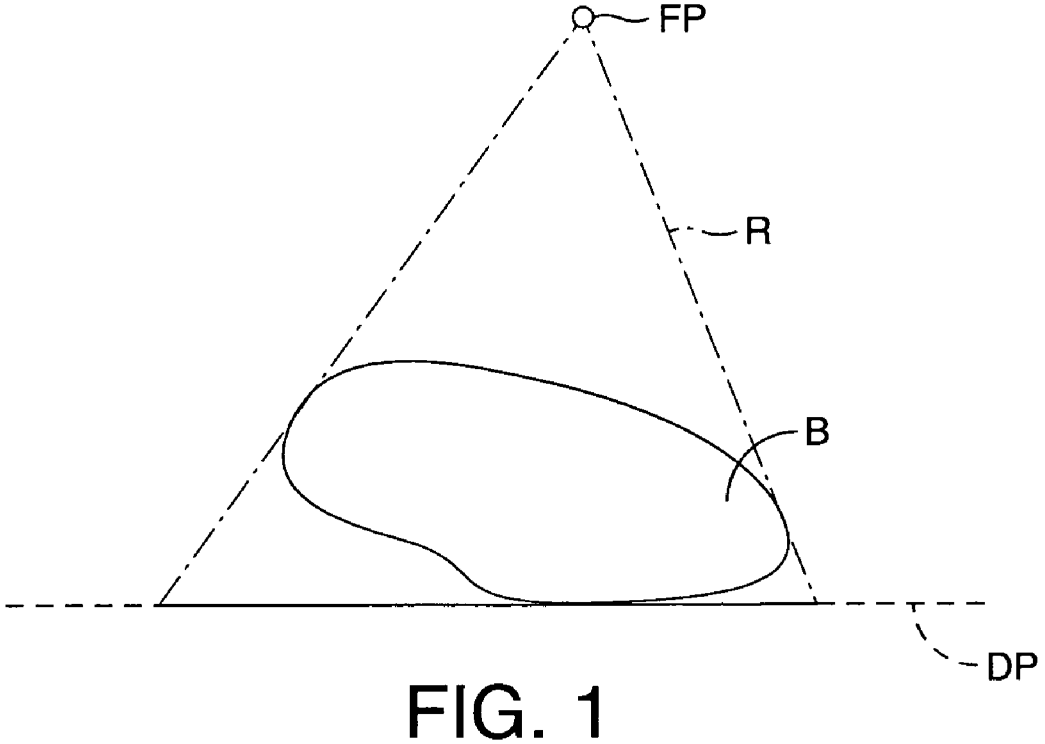
FIG. 1 is a schematic illustration showing X-rays passing from a source at a focal point, through an object such a patient's body, and to a detector plane.
Figure 2:
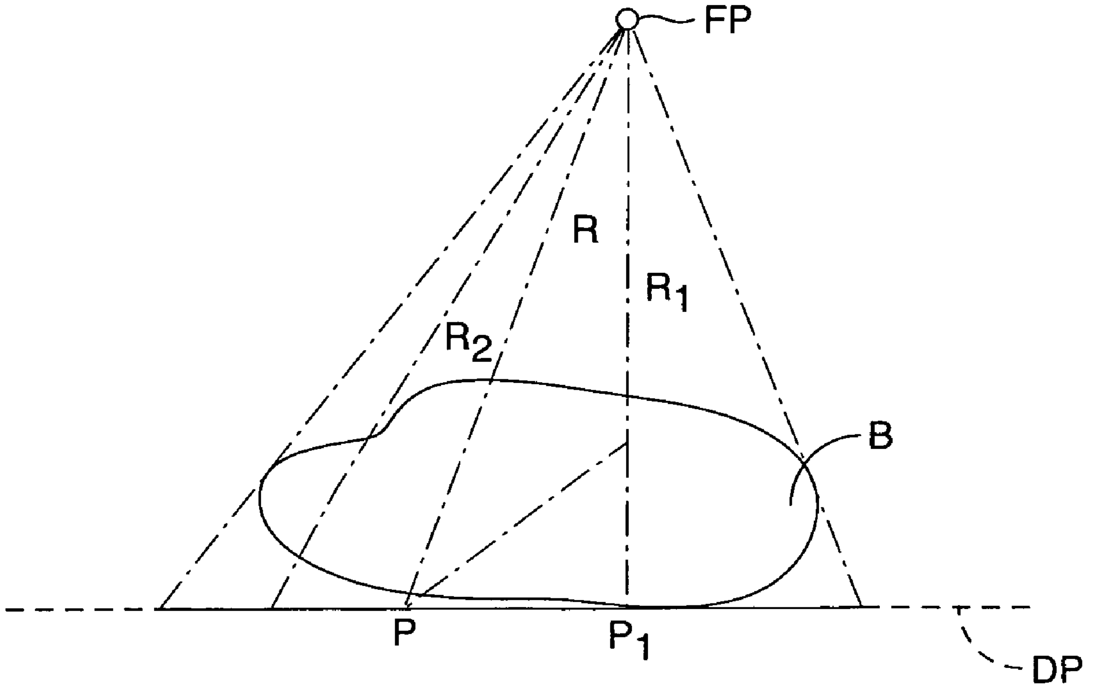
FIG. 2 is a schematic illustration showing X-rays passing from a source at a focal point, through an object such a patient's body, and to a detector plane, and wherein some of the X-rays are shown being deflected or scattered before reaching the detector plane.

X-ray imaging uses the fact that x-rays "R" are extremely penetrating but are absorbed by the material "B" (such as a patient's body) through which they pass. An x-ray image is the two-dimensional map of the x-ray absorption of the material "B" lying between an x-ray source located at a focal point "FP" and an X-ray detector located at a detector plane "DP". FIG. 1 shows a typical medical x-ray imaging situation. The quality of the image depends on the fact that a significant fraction of the x-rays R are absorbed rather than scattered. Referring to FIG. 2, Ray R is emitted from the source located at the focal point FP and detected at point P by the X-ray detector located at the detector plane DP. Ray $R_1$ scatters and is also detected at the point P. Ray $R_2$ is totally absorbed and, therefore, not detected. In the making of an image, occurrences such as these happen many millions of times.

The fact that $R_1$ scattered and was detected at P causes density along the ray $R_1$ to be appropriately assigned to the point $P_1$. However, the point P receives radiation from the ray $R_1$ and, therefore, the density along the ray R is measured to be lower than it actually is. Since scattering occurs in all directions, there is very little spatial information contained in the scattered radiation. The scattered radiation tends to blur the image and lower the measured absorption of localized regions of high absorption. It also increases the noise since the scattered radiation fluctuates statistically. Finally, since it varies over the image it creates a varying baseline on which the image is superimposed.

Figure 3:
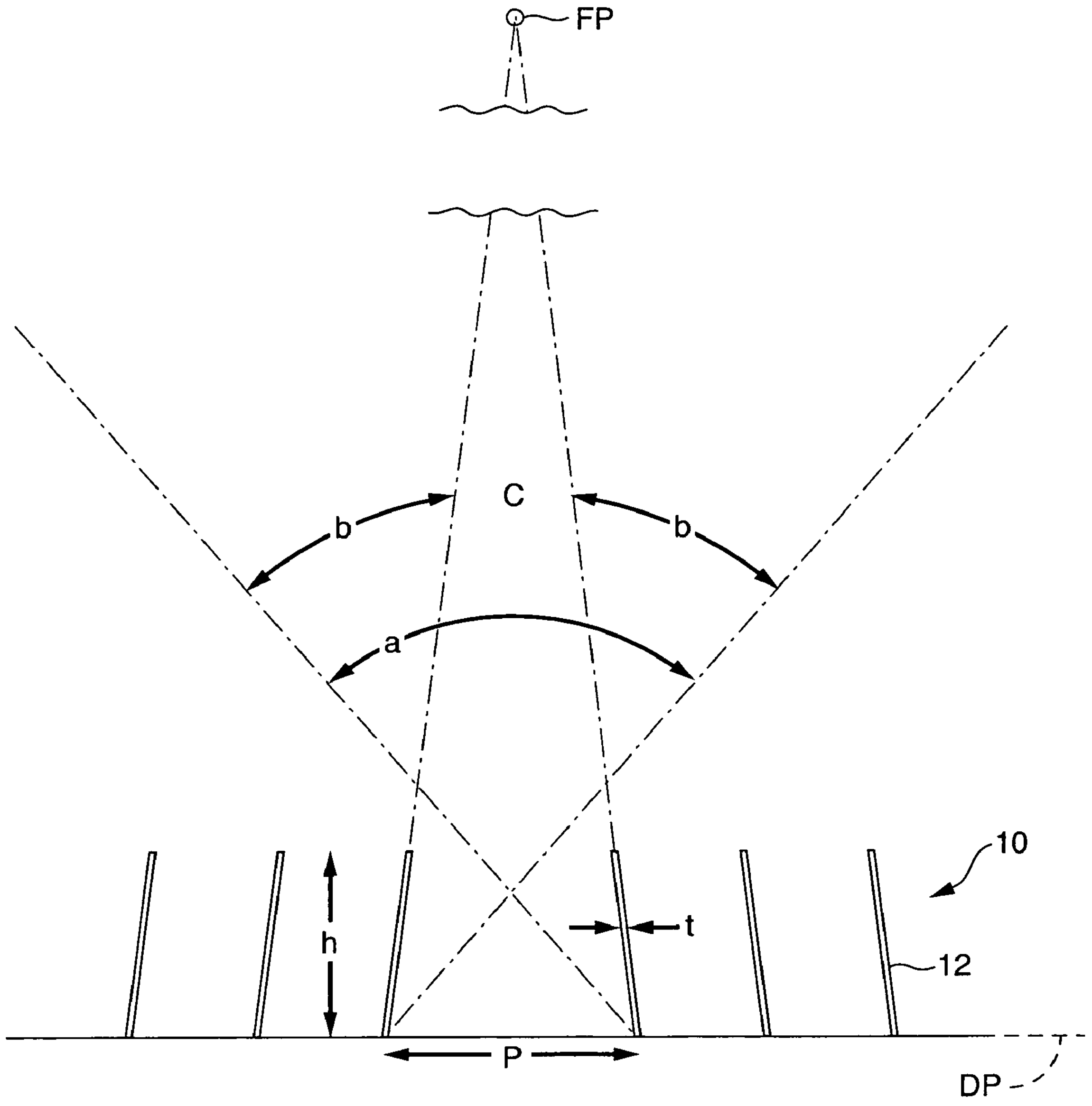
FIG. 3 is a schematic illustration showing an exemplary embodiment of an anti-scatter grid constructed in accordance with the present invention and positioned between a source at a focal point and a detector plane, and illustrating how the anti-scatter grid prevents deflected or scattered X-rays from reaching the detector plane.
Figure 4:
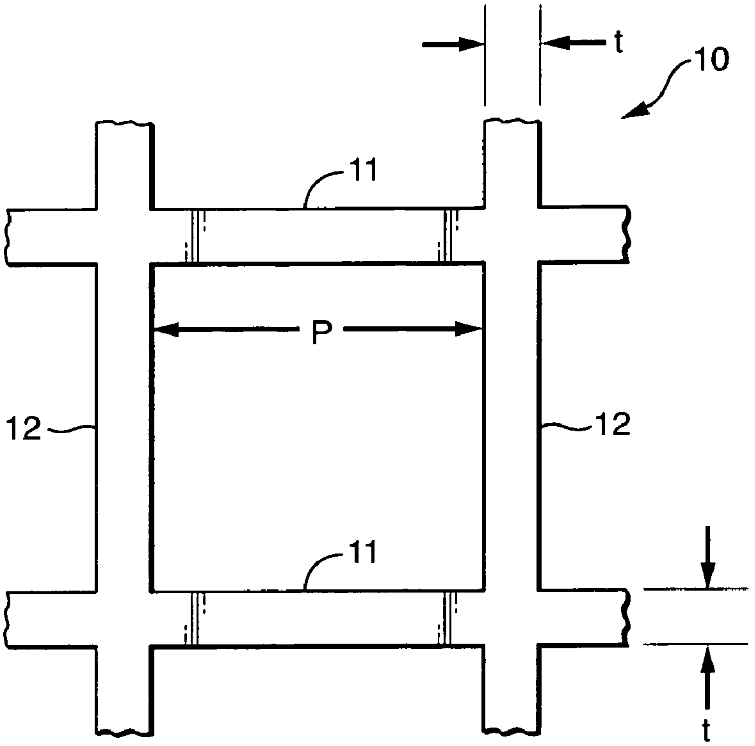
FIG. 4 is a top plane view of a portion of the grid of FIG. 3.
Figure 5:
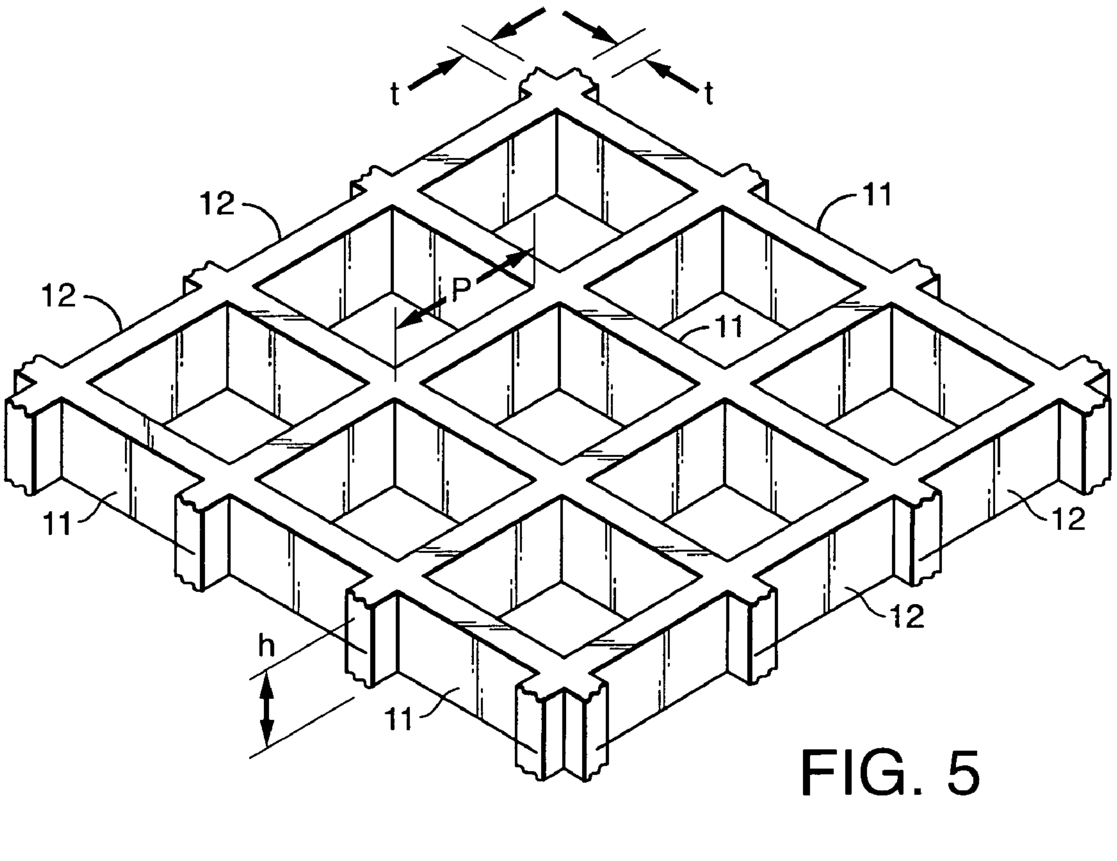
FIG. 5 is a top perspective view of a portion of the grid of FIG. 3.

This problem can be ameliorated by placing a grid 10 of plates 11, 12 in front of the X-ray detector DP which prevents the scattered radiation from reaching the detector, as shown in FIG. 3. The grid 10, which is also shown in FIGS. 4 and 5, is formed of a radiopaque material, such as lead, tungsten, copper or nickel. Each of these plates 11, 12 should be positioned so that the focal point FP lies in the plane of the plate 11, 12. As illustrated in FIG. 3, it is clear that scattered radiation emanating from outside region (a) will not be detected; a fraction of the radiation emanating from the two regions labeled (b) will be detected; and all the radiation emanating from (c) will be detected. In practice the grids are much higher and narrower so that (a) & (b) are much smaller.

Furthermore, it is clear that this grid 10 will remove some of the unscattered radiation because the plates 11, 12 have a finite thickness "t". For a one-dimensional grid, the geometric efficiency of the grid 10 is (p−t)/p where "p" is the period of the grid. For a two-dimensional grid, the geometric efficiency of the grid is $[(p-t)/p]^2$. It is also clear that the effectiveness of the grid 10 in removing scattered radiation increases as the ratio h/p increases, where "h" is the height of the grid 10 in the direction of the x-ray beam.

Exemplary embodiments of the present invention provide techniques for making the focused anti-scatter grid 10 of FIGS. 3 through 5 efficiently and with high precision in those attributes which are important. The resulting grid structure is a sturdy and highly useful implement in the X-ray patient diagnostic imaging field, and provides the desired absorption of scattered secondary radiation. In addition, techniques conducted in accordance with the present invention can go to smaller characteristic dimensions, are relatively easier, less time-consuming and less expensive than existing techniques for making focused anti-scatter grids.

Figure 6:
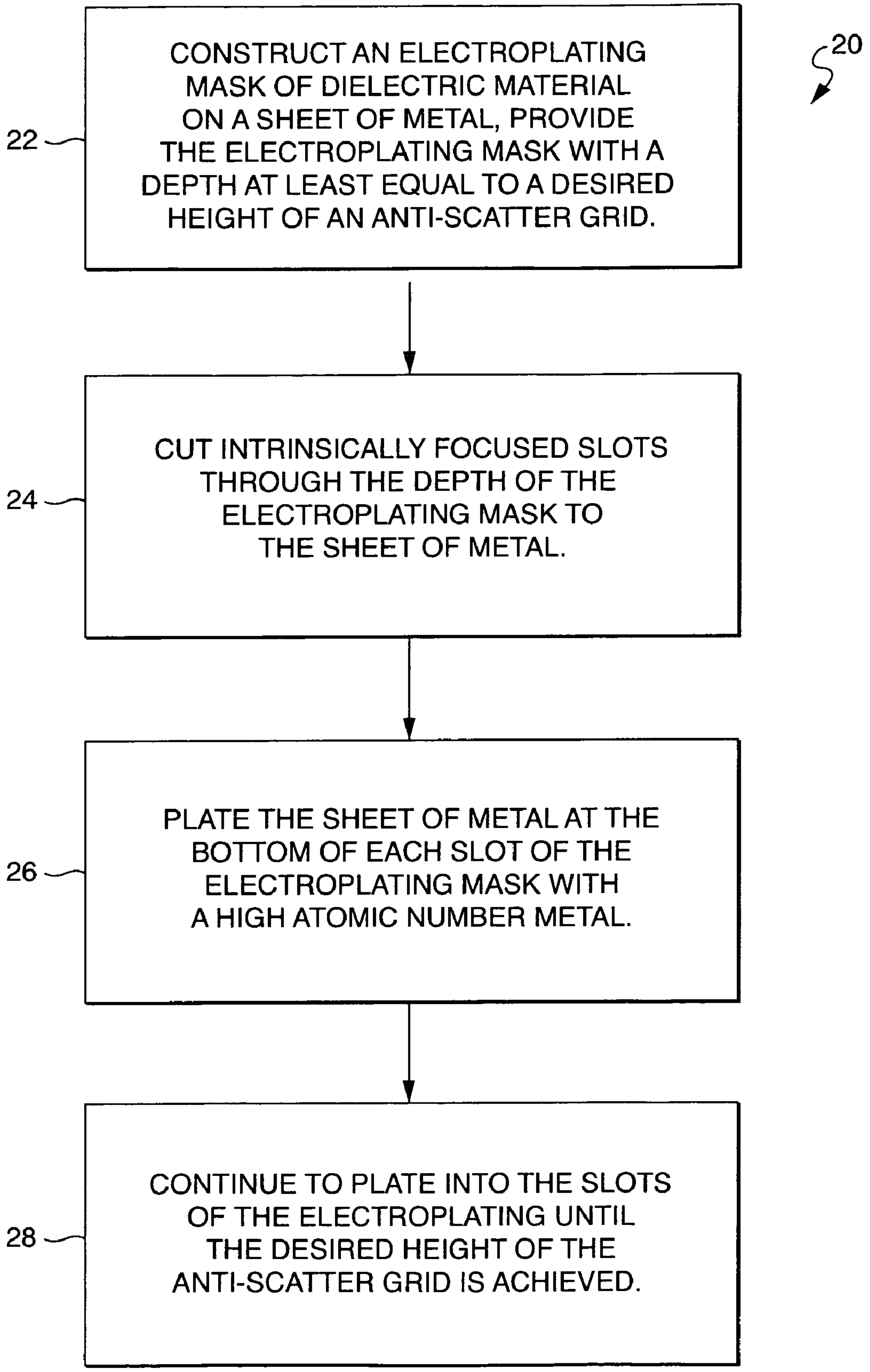
FIG. 6 is a flow chart illustrating an exemplary embodiment of a method for manufacturing the anti-scatter grid of FIG. 3 using a plating mask, in accordance with the present invention.

One exemplary embodiment of a method (the exemplary embodiment of the method is illustrated as a flow chart labeled as reference numeral "20" in FIG. 6) according to the present invention for manufacturing the anti-scatter grid 10 having a desired height h (with reference to FIG. 3) and includes positioning a bottom surface of a mask of dielectric material, with a depth at least equal to the desired height of the anti-scatter grid, on a sheet of metal, as shown at 22 of FIG. 6. First and second series of intrinsically focused slots are then cut through a top surface of the mask to the sheet of metal, as shown at 24 of FIG. 6, and the sheet of metal is plated at the bottom of each of the slots of the mask with a radiopaque material to form partition walls of the anti-scatter grid, as shown at 26 of FIG. 6. Plating the radiopaque material into the slots of the mask is continued, as shown at 28 of FIG. 6, until the desired height h of the anti-scatter grid 10 (with reference to FIG. 3) is achieved.

Figure 7:
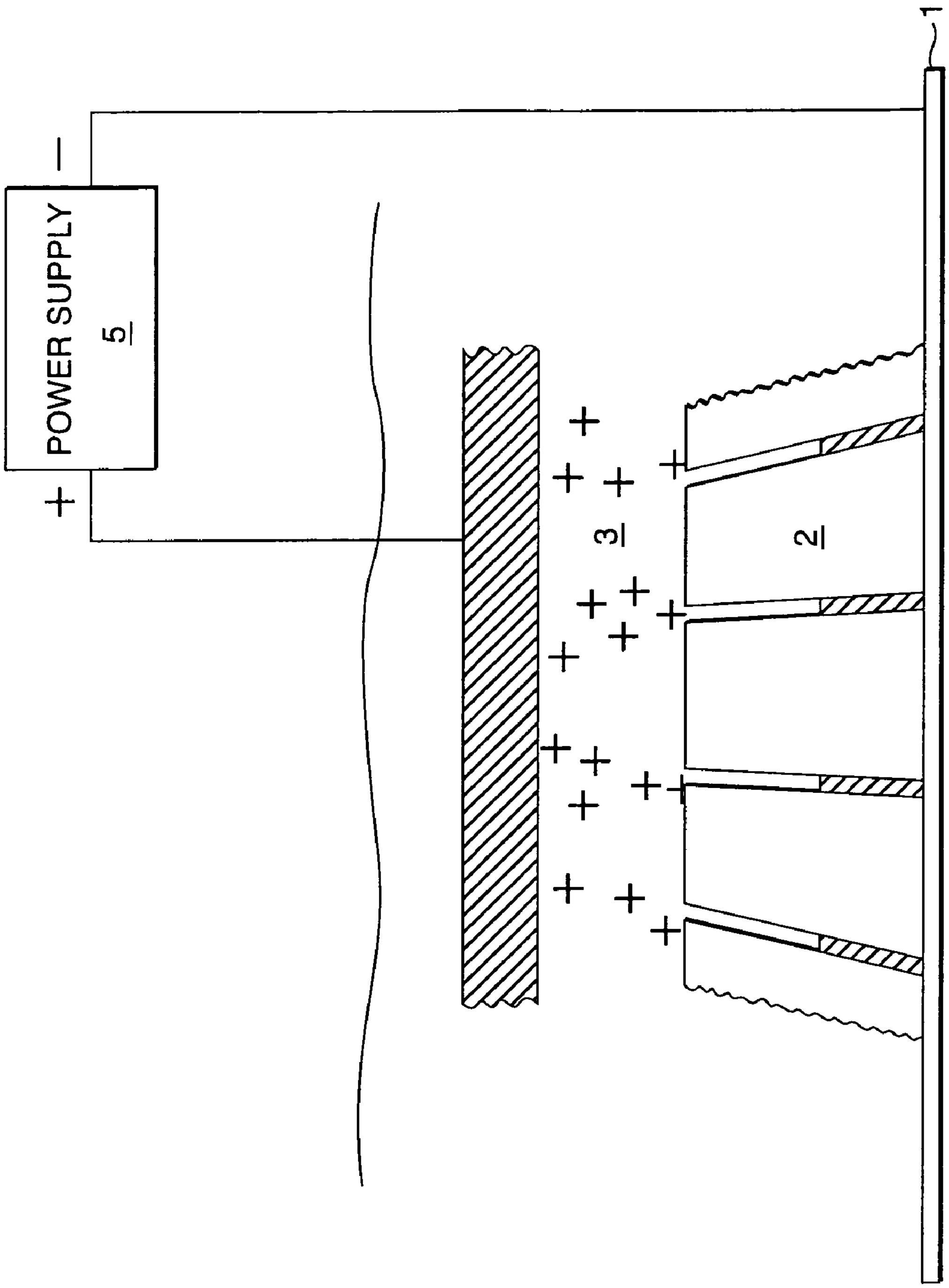
FIG. 7 a schematic illustration showing an exemplary embodiment of a method for plating the anti-scatter grid of FIG. 3 using the plating mask in accordance with the method for FIG. 6.

FIG. 7 a schematic illustration showing an exemplary embodiment of a method for plating the anti-scatter grid 10 of FIGS. 3 through 5 using the mask in accordance with the method for FIG. 6. The metal plate 1, on which the dielectric plating mask 2 is bonded, is immersed in an electrolyte 3 containing ions of the desired radiopaque material. An anode 4 of the same radiopaque material is placed in the electrolyte. The anode is connected to the positive terminal of a power supply 5 and the metal plate 1 (cathode), with the plating mask, is connected to the negative terminal. Positive ions are driven to the negatively charged cathode. By this technique, radiopaque material will build up in the slots resulting in a grid 10 of radiopaque material being formed.

According to one exemplary embodiment, the metal sheet comprises aluminum and the mask comprises a fine grain styrene foam. The mask is secured to the metal sheet using hot wax, and the wax is scraped from the metal sheet at the bottom of each slot of the mask prior to plating. The surface of the metal sheet should be clean and free of contaminants so that a good bond can be achieved between the plated structure and the sheet. If the surface of the metal to be plated is not perfectly clean, it may be necessary to etch it or clean it chemically or electrochemically in some way.

When the aluminum plate with the plating mask is completed, they are placed in a plating bath. At this point, a radiopaque material is plated through the slots in the plating mask on to the aluminum of the backing plate. The plating continues until the grid is thick enough. At this point, the radiopaque material of the grid may be smooth and uniform, in which case the aluminum backing electrode may be dissolved in sodium hydroxide, or other agent for dissolving the metal sheet without dissolving the grid, the plating mask dissolved in an organic solvent, and the grid carefully cleaned. Alternatively, the metal sheet, can be provided as a very thin layer secured onto a thicker layer of radiolucent material, such as carbon fiber. In this manner, the combination of the thin layer of the metal sheet and the thicker layer of the radioluscent material can remain attached to the grid without substantially interfering the passage of x-rays through the grid. The metal sheet can also be provided as a very thin layer of a metal grid secured to a thicker support layer of radiolucent material.

If the radiopaque material of the grid is uneven, the grid should be machined in some fashion to make it uniform. This is probably best done while the plating mask is still supporting the grid. After this, the aluminum electrode and plating mask are removed as explained above. When the grid is completely clean, a very thin layer of carbon fiber laminate or other suitable material may be glued to each face of the grid and the frame to protect and stabilize the grid.

Alternately, the surface of the radiopaque material may be left rough so long as it is entirely within the slots of the plating mask. Furthermore, under some circumstances, the plating mask may be left in place if its absorption of x-rays is very small compared to that of the radiopaque material.

Figure 8:
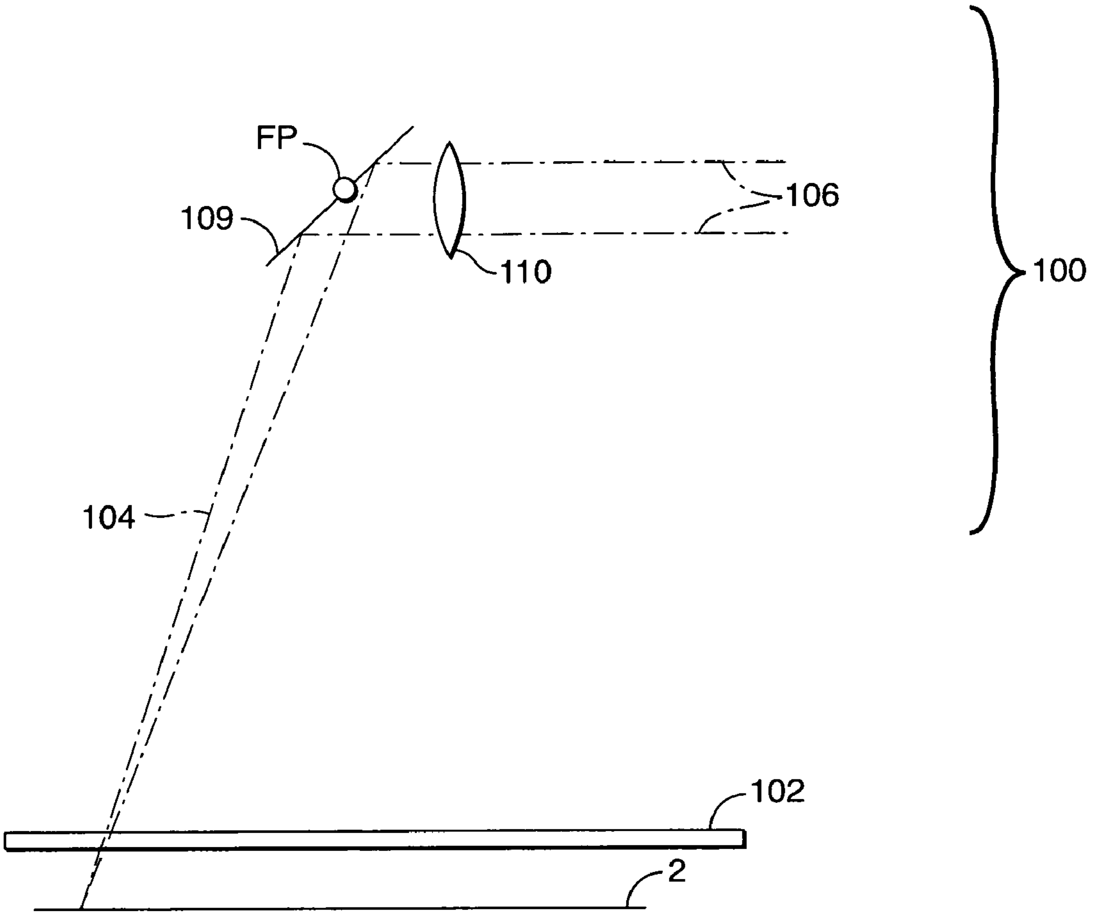
FIG. 8 is a diagram illustrating an exemplary embodiment of an apparatus for focusing and directing laser light for cutting the plating mask of FIG. 6 in accordance with the present invention.

FIG. 8 illustrates an exemplary embodiment of an apparatus 100 which can be used to cut intrinsically focused slots in a plating mask 2. A laser source 106 is focused on to the plating mask 2 through a mirror 109 using a long focal length lens 110. The mirror 109 is moved to direct a laser beam 104 from the laser source 106 to produce the desired pattern on the plating mask 2, or alternately, a photomask 102 is placed close to the plating mask 2 to provide the desired pattern. Because the mirror rotates in at least two dimensions about the focal point, the resulting slots are cut so that they are each focused on the focal point. This apparatus 100 can be used if the laser light 104 has enough power to cut the plating mask 2 or expose a photo resist using a long focal length lens 110.

For situations where a short focal length must be used, or the energy source is x-rays instead of laser light and therefore cannot be deflected by a mirror, the mask 2 can be moved with respect to the energy source (e.g., by an apparatus 200 such as shown in FIGS. 10-13).

Figure 9:
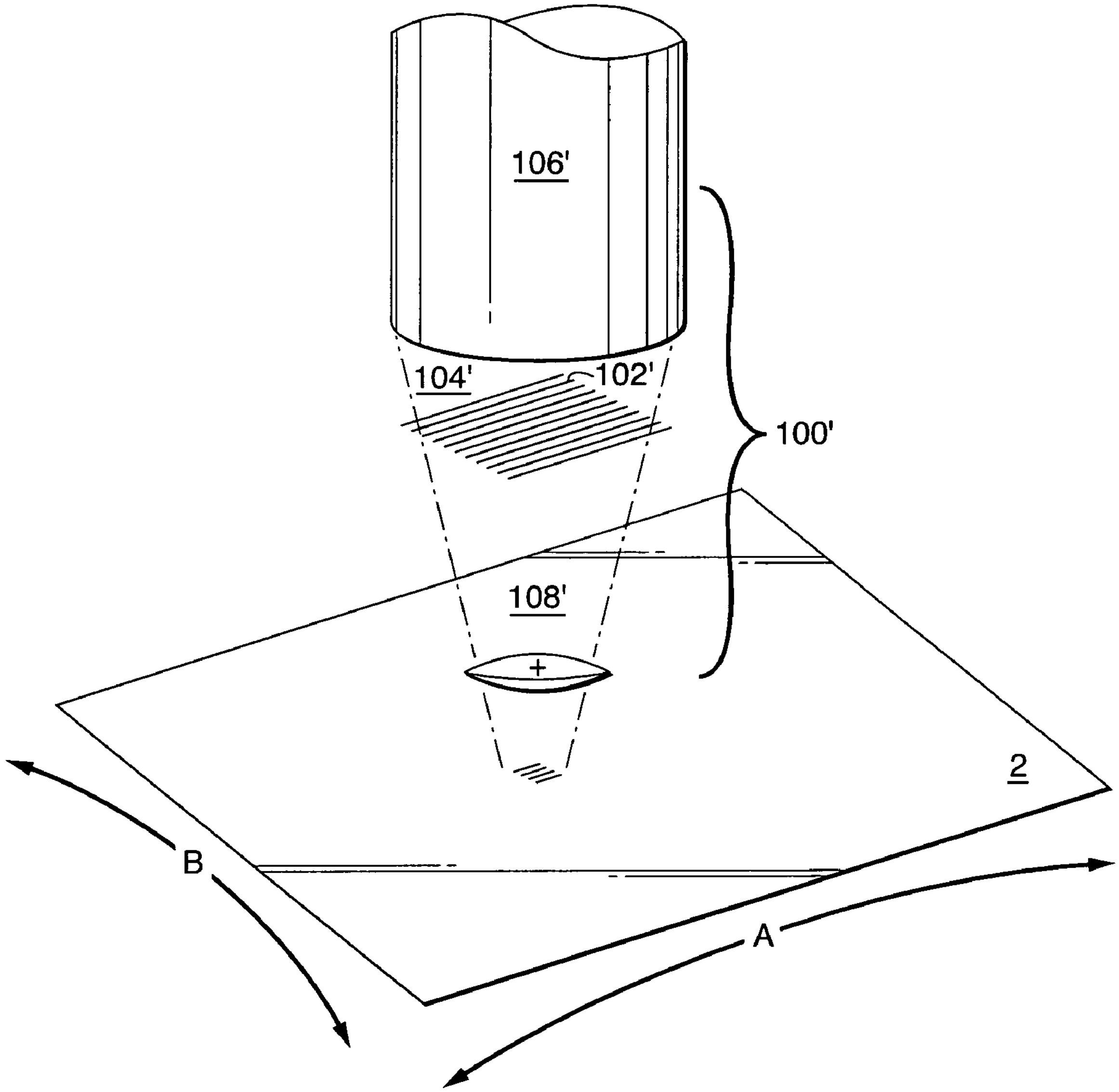
FIG. 9 is a perspective view of the apparatus of FIG. 8, which directs laser light through a photomask and a short focal length lens system which focuses and concentrates the laser light on the plating mask of FIG. 6.

FIG. 9 illustrates another exemplary embodiment of an apparatus 100' and method for cutting the mask 2 of FIG. 7 in accordance with the present invention. The apparatus 100' includes a photomask 102' having a series of parallel slots for forming a single laser beam 104' from a laser source 106' into a series of parallel laser beams 108', which are concentrated on the surface of the mask 2 by a lens 110'. These beams cut slots which are parallel to each other, within the small pattern of the photomask 102'. They make intrinsically focused slots in the mask 2 by virtue of the plating mask 2 being moved, as shown by the curved arrows A and B, on the surface of a sphere centered at the focal point FP. The apparatus 200 shown in FIGS. 10-13 produces and controls the movement of the plating mask 2, as shown by the curved arrows A and B in FIG. 9, on the surface of a sphere centered at the focal point FP.

During a cutting procedure, either the plating mask 2 can be moved with respect to the apparatus 100 (e.g., as in FIGS. 10-13), or the energy can be moved with respect to the plating mask 2 (e.g., as in FIG. 8), to successively cut groups of slots in the mask 2 until the entire mask is cut as desired. For example, the apparatus 100 of FIG. 9 can remain stationary, while the mask 2 is moved with respect to the apparatus 100 using a second apparatus such as the exemplary apparatus 200 shown in FIGS. 10 through 13.

FIGS. 10 through 13 illustrate another exemplary embodiment of an apparatus 200 and method for cutting the mask 2 of FIG. 7 in accordance with the present invention. In general, the apparatus 200 is for moving a mask 2 with respect to a fixed cutting device, such as one or more lasers, optical lithography machines or X-ray lithography machines, so that a series of intrinsically focused slots having a common focal point "FP" can be cut in the mask 2. In addition to being used to cut a mask 2 for use in forming an X-ray anti-scatter grid, an apparatus constructed in accordance with the present invention, such as the apparatus 200 of FIGS. 10 through 13, can be used in other processes in order to move a mask with respect to a fixed optical lithography machines or X-ray lithography machine, such as used in the irradiating process of LIGA micromachining.

Figure 10:
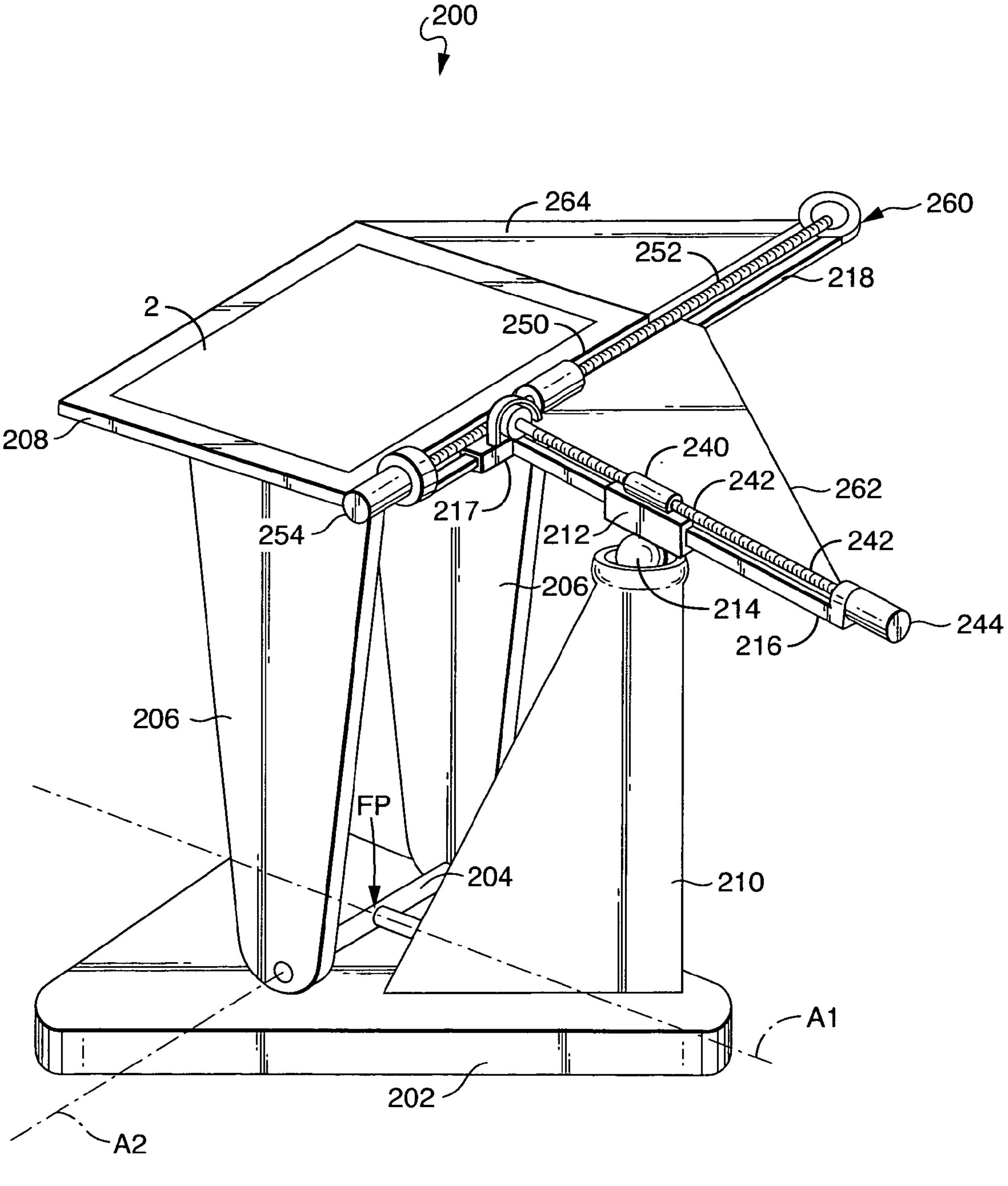
FIG. 10 is a perspective view of an exemplary embodiment of an apparatus that supports and positions the plating mask of FIG. 6, while the plating mask is being cut by the laser light, in accordance with the present invention.
Figure 11:
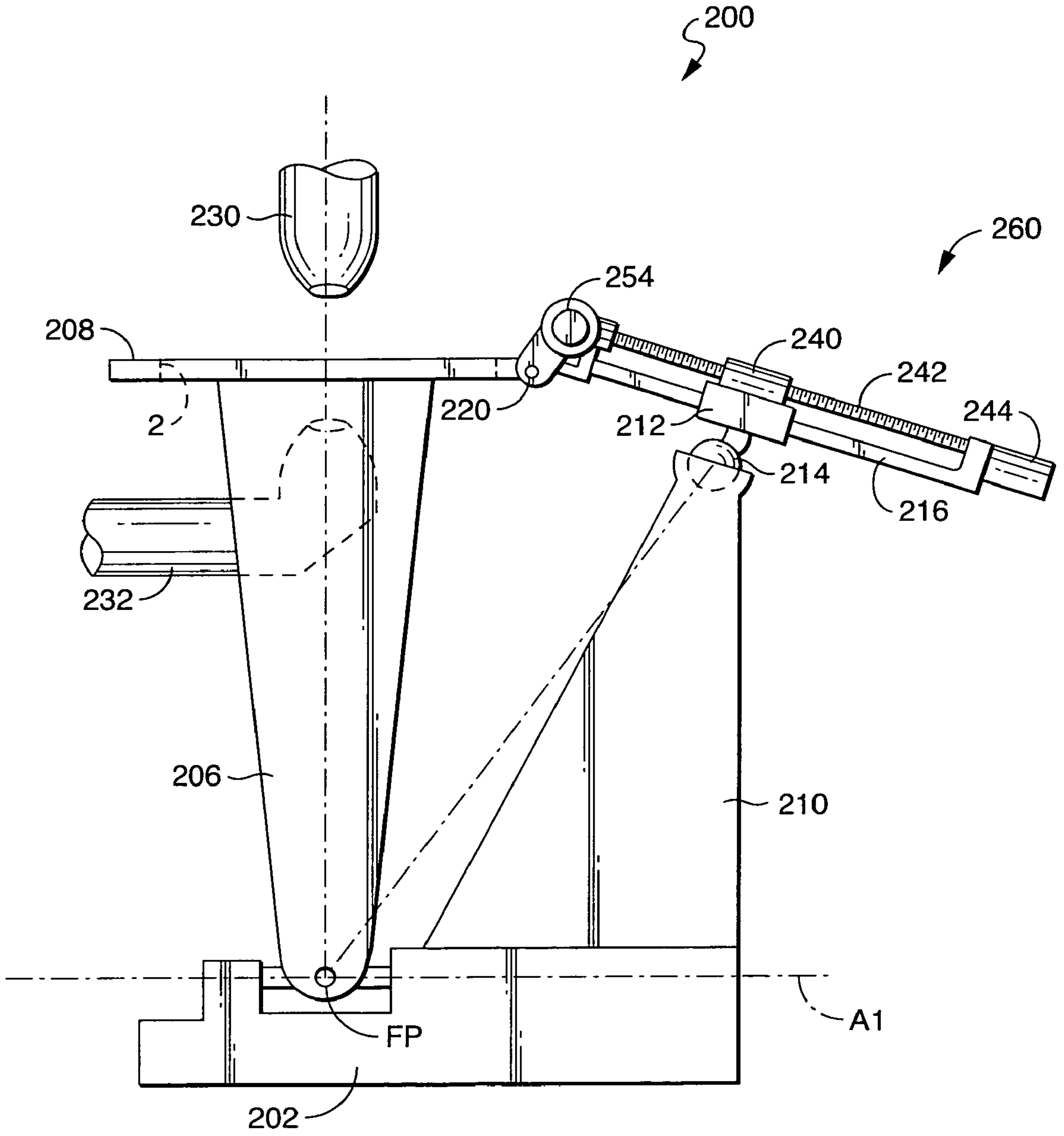
FIG. 11 is a side elevation view of the apparatus and the method of FIG. 10, wherein the apparatus is shown in a first position.
Figure 12:
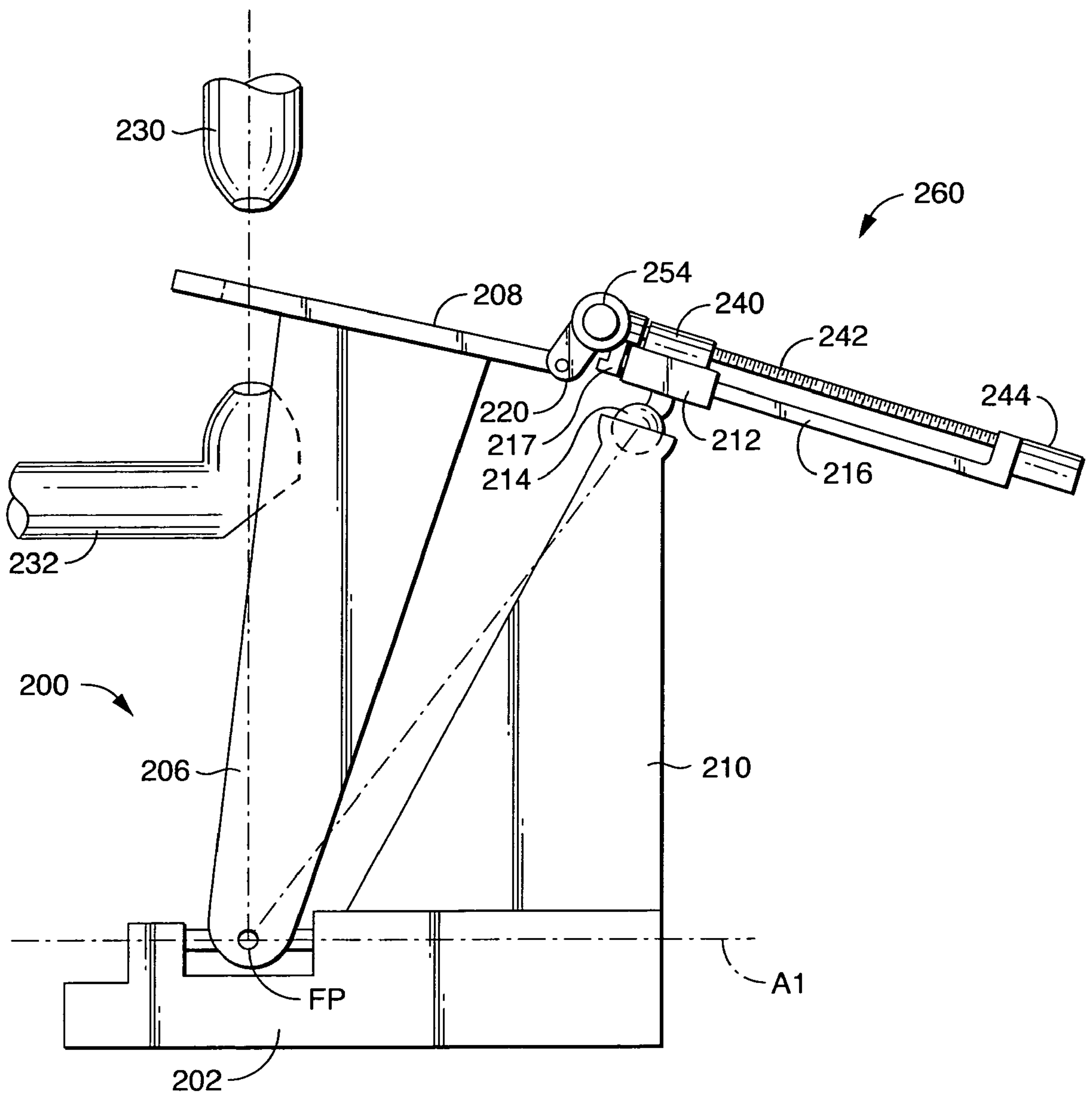
FIG. 12 is a side elevation view of the apparatus and the method of FIG. 10, wherein the apparatus is shown in a second position.

Moving the mask with respect to a fixed laser, or other cutting or exposing machines, requires two structures: one structure to hold the mask so it moves on the surface of a sphere without rotation about a line extending from a focal point to the mask, and a second structure to control the mask motion so that the laser light, or other energy, impinges on the mask in a precisely controlled and reproducible manner. Referring to FIG. 10, an apparatus 200 constructed in accordance with the present invention provides the first structure by mounting the mask 2 in a frame 208, which is held so that the mask 2 moves on a surface of an imaginary sphere (not show) centered at a focal point FP. The second structure is provided by a mechanism 260 in which there is a pair of adjustable slides lying in a plane perpendicular to a line from the focal spot and perpendicular to each other. These two slides create a Cartesian coordinate system in which a ball 214 may be moved. The mechanism 260 is fixed to the frame 208 at the hinge 220, as shown in FIGS. 11 and 12. The ball 214 is fixed with respect to the energy source, schematically shown as 230 or 232, by a socket supported on a column 210.

Moving the ball 214 in the Cartesian coordinate system 260 of the mechanism 260 moves the plating mask 2 with respect to the energy source 230 or 232 so that the beam of energy emanating from the focal point FP or directed towards the focal point FP impinges on the mask 2 in a precisely reproducible manner. It is clear from FIGS. 11 and 12, that the slots cut in the plating mask 2 (or exposed in the plating mask if it is a photoresist) will be focused on the focal point FP whether the energy is directed toward the focal point FP, as is the case with the energy source comprising 230, or away from the focal point FP, as is the case with the energy source comprising 232. For a beam of x-rays from a synchrotron, the pivot 204 will be a ring so that there is not scattering material at the focal point FP, and the entire apparatus is turned so that the beam is horizontal.

In the exemplary embodiment of FIGS. 10 through 13, the apparatus 200 includes a base 202, and a linkage 204 pivotally connected to the base for pivotal movement about a first axis “A1”. The linkage 204 extends along a second axis “A2”, which in turn extends perpendicular with respect to the first axis A1. The apparatus 200 also includes two legs 206, each having a first end pivotally connected to the linkage 204 for pivotal movement about the second axis A2, and the frame 208 adapted to hold the plating mask 2 is secured to distal, second ends of the legs 206. The combination of the linkage 204 and the two legs 206 pivotally connected to the linkage 204 acts as a gimbal and allows the frame 208 to move on a surface of an imaginary sphere (not shown) centered at a focal point FP. If desirable, the linkage 204 may be a circle with two sets of pivot shafts so that there is no material at the focal point FP.

A stand 210 extends from the base 202 (the stand does not pivot, but is fixed with respect to the base and the energy source 230 or 232) and supports the adjustment system 260. A first slide 212 is secured to a distal end of the stand 210 for pivotal movement with respect to the distal end of the stand 210. In the exemplary embodiment shown, the first slide 212 is secured to the stand through a ball joint 214, which allows pivotal movement of the first slide 212 with respect to the stand 210. A first guide 216 is in turn supported by the first slide 212 for movement with respect to the first slide 212. A second slide 217 is secured to an end of the first guide 216, and the second slide 217 supports a second guide 218 for movement of the second guide 218 with respect to the second slide 217. The second guide 218, and thus the adjustment system 260, is pivotally connected to the frame 208 through a hinge 220, shown in FIGS. 11-13. The adjustment system 260 is attached to the frame 208 and provides a Cartesian coordinate system in a plane which is perpendicular to a line emanating from the focal point FP. The design of the apparatus 200 allows the frame 208 to be used to support the plating mask 2 with respect to a laser 230 (shown in FIGS. 11 and 12) or other source for cutting a series of intrinsically focused slots in the mask 2 having a common focal point FP located at the intersection of the first and the second axes A1, A2.

The apparatus 200 also includes mechanisms for causing movement of the first guide 216 with respect to the first slide 212, and movement of the second guide 218 with respect to the second slide 217. In the exemplary embodiments shown, a first of the mechanisms includes a non-rotatable nut 240 secured to the first slide 212, and a rotatable lead screw 242 extending through the nut 240 and secured at opposing ends to the first guide 216. A second of the mechanisms includes a non-rotatable nut 250 secured to the second slide 217, and a rotatable lead screw 252 extending through the nut 250 and secured at opposing ends to the second guide 218. Each mechanism further includes a motor and encoder assembly 244, 254 operatively connected, respectively, to the lead screws 242, 252 for causing rotation of the lead screws. The adjustment system 260 also includes a first brace 262 maintaining the first guide 216 perpendicular to the second guide 218, and a second brace 264 supporting the frame 208 and connecting the frame 208 to the hinge 220 of the second guide 218.

Figure 13:
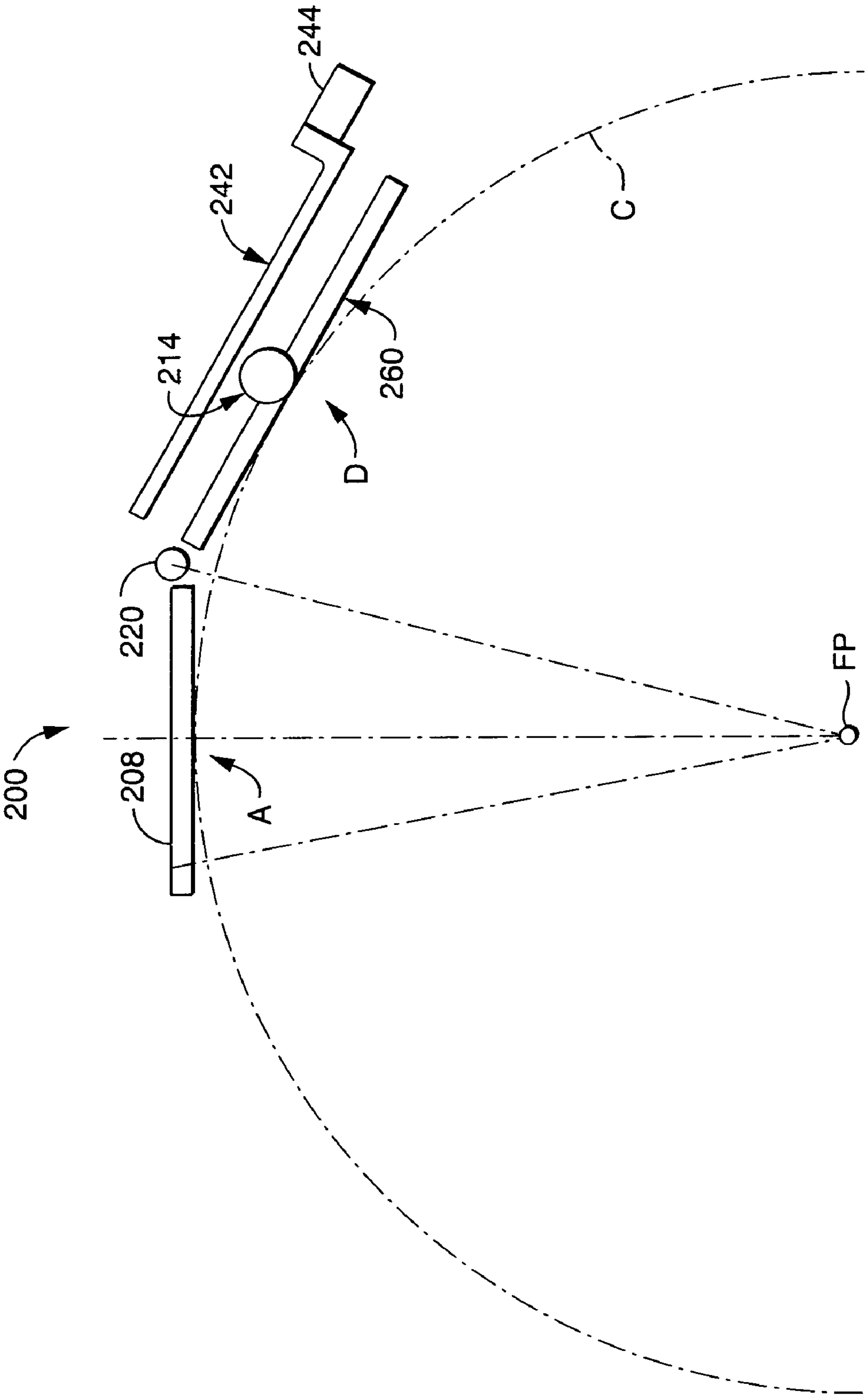
FIG. 13 is a diagram of the apparatus and the method of FIG. 10.

Referring to the diagram of FIG. 13, the plating mask 2 to be cut occupies a rectangular region in the frame 208 that lies tangent to a surface of an imaginary sphere, illustrated in FIG. 13 by broken line “C”, which is centered at the focal point FP. If the axis of the laser or other energy source goes through the square region of the frame 208, then the slots cut by the laser will all lie in planes going through the focal point FP (whether the energy is going toward or away from the focal point FP). The lead screws 242, 252 move the gimbal 214 in a plane which is also tangent to the same sphere C. The two planes are joined at the hinge 220. As the lead screws 242, 252 move the ball joint 214 tangent to the sphere C, the point where the laser or x-ray beam strikes the plating mask in the frame 208 moves a corresponding amount.

In the exemplary embodiment of FIGS. 11 and 12, the apparatus 200 includes a first laser source 230 for directing a laser beam towards a first side of a plating mask 2 supported on the frame 208. It may be necessary to cut the mask 2 from both sides. In the exemplary embodiment of FIGS. 11 and 12, therefore, the apparatus 200 further includes a second laser source 232 for directing a laser beam towards a second side of the plating mask 2 supported on the frame 208.

It will thus be seen that the objects set forth above, and those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An apparatus for forming a plating mask having a plurality of slots each focused at a common focal point, the apparatus configured for use with an energy beam defining a beam axis and of sufficient intensity to cut slots in the plating mask, the apparatus comprising:

a base fixed with respect to the beam axis and a pivot point, the beam axis intersecting the pivot point, wherein the pivot point forms a focal point for slots formed in the plating mask by the energy beam;

a frame connected to the base through a linkage and defining a frame radius from the pivot point, the frame configured and arranged hold the plating mask in a plane perpendicular the frame radius, wherein the frame includes a gimbal configured to allow the linkage to pivot at the pivot point about first and second orthogonal axes in two orthogonal angular directions, respectively, each of the axes being fixed relative to the beam axis of the energy beam, and wherein the frame is movable such that the intersection point frame and the frame radius is movable through a loci of points defining a portion of an imaginary spherical surface centered about the pivot point; and an adjustment assembly connected between the base and the frame and adapted to move the frame about the imaginary spherical surface, wherein movement of the frame about the imaginary spherical surface allows the energy beam to cut intrinsically spherically focused slots into a plating mask held by the frame, wherein the slots are configured and arranged for spherically focusing at the common focal point X-ray radiation that is incident on the plating mask.

2. An apparatus according to claim 1, wherein the adjustment assembly comprises:

a stand extending from the base;

a first slide secured to a distal end of the stand for pivotal movement with respect to the distal end of the stand;

an elongated first guide supported by the first slide for movement with respect to the first slide;

a second slide secured to a distal end of the first guide; and an elongated second guide pivotally connected to the frame and supported by the second slide for movement with respect to the second slide.

3. An apparatus according to claim 2, further comprising a mechanism for causing movement of the first guide with respect to the first slide.

4. An apparatus according to claim 3, wherein the mechanism comprises:

a non-rotatable nut secured to the first slide; and a rotatable lead screw extending through the nut and secured to the first guide.

5. An apparatus according to claim 4, wherein the mechanism further comprises a motor/encoder assembly operatively connected to the lead screw of the first guide for rotating the lead screw.

6. An apparatus according to claim 2, further comprising a mechanism for causing sliding movement of the second guide with respect to the second slide.

7. An apparatus according to claim 6, wherein the mechanism comprises:

a non-rotatable nut secured to the second slide; and a rotatable lead screw extending through the nut and secured to the second guide.

8. An apparatus according to claim 7, wherein the mechanism further comprises a motor/encoder assembly operatively connected to the lead screw of the second guide for rotating the lead screw.

9. An apparatus according to claim 1, further comprising a first laser source for directing the beam of energy towards a first side of a plating mask supported on the frame and through the focal point.

10. An apparatus according to claim 9, further comprising a second laser source for directing for directing a second beam of energy towards a second side of the plating mask supported on the frame and through the focal point.

11. An apparatus according to claim 1, wherein the first guide is secured to the distal end of the stand through a ball and socket joint.

12. An apparatus according to claim 1, wherein the linkage includes a circle with two sets of pivot shafts configured so that there is not material at the focal point.

13. An apparatus according to claim 1, further comprising an energy source configured and arranged to produce the energy beam.

14. An apparatus according to claim 13, wherein the energy source comprises a laser.

15. An apparatus according to claim 1, wherein the frame comprises an aperture adapted to hold the plating mask.

* * * * *